United States Patent [19]

Sou

[11] 4,256,056

[45] Mar. 17, 1981

[54] PORTABLE CASE FOR CARRYING SMALL ANIMAL

[76] Inventor: Teho Sou, 7-18 Higashiimazato 2-chome, Higashinari-ku, Osaka, Japan

[21] Appl. No.: 39,848

[22] Filed: May 17, 1979

[30] Foreign Application Priority Data

Mar. 17, 1979 [JP] Japan ................................. 54-34555

[51] Int. Cl.³ ......................... A01K 1/02; A01K 1/03
[52] U.S. Cl. ................................................. 119/19
[58] Field of Search ............... 220/6, 7, 23, 4 F, 94 R, 220/94 A; 119/19, 17

[56] References Cited

U.S. PATENT DOCUMENTS

| | | | |
|---|---|---|---|
| 2,079,458 | 5/1937 | Leichtfuss | 220/7 |
| 2,766,796 | 10/1956 | Tupper | 220/23 X |
| 3,234,908 | 2/1966 | Doskocil | 119/19 |
| 3,490,417 | 1/1970 | Swinney | 119/19 |
| 3,973,692 | 8/1976 | Cloyd | 220/7 |

FOREIGN PATENT DOCUMENTS 1166867 11/1958 France ........................................ 119/19

Primary Examiner—Hugh R. Chamblee
Attorney, Agent, or Firm—Trexler, Wolters, Bushnell & Fosse

[57] ABSTRACT

A portable case, into which the pet fancier puts his small animal and carries it about, is disclosed, wherein the main body of the case is constructed by putting together a pair of side wall boards, a top board connected at its left and right sides to the respective upper end faces of the left and right side wall boards through the aid of hinged joints, and a bottom board connected at its left and right sides to the respective lower end faces of the left and right side wall boards likewise as above through the aid of hinged joints, which main body of the case is furnished at its front and rear sides with the respective on-off door leaves, and the case thus constructed can be simply folded up by opening both the door leaves.

12 Claims, 8 Drawing Figures

PORTABLE CASE FOR CARRYING SMALL ANIMAL

The present invention relates to a portable case into which the pet fancier puts his small animal, for example, such as pup or puss and carriers it about.

It is well-known that there is something what is called a portable case into which the pet fancier put his house pet he keeps so as to be able to carry it about when going out.

However, such kind of portable case heretofore in use has a weak point of occupying a great deal of space at the time of putting it in order because it is always tenacious of a cubical form even when being not used.

Thereupon, the present invention has for its object to provide a portable case for carrying a small animal, which case is so designed as to be able to be folded up when not letting the animal in, and as not to take up much room at the time of being put back.

Another object of this invention is to provide a portable case for carrying a small animal which is foldable and erectable through a simple manipulation.

A further object of the present invention is to provide a portable case for carrying a small animal whose door leaves do not open of itself during accommodating the animal within, in consequence of which there is no fear of the animal's running away accidentally.

These and other objects of the present invention will be more clearly understood from a reading of the following description taken in connection with the accompanying drawings in which:

FIG. 4 is a longitudinal sectional view of a part of a door leaf, showing the state of its being fitted-in;

Figure 1:
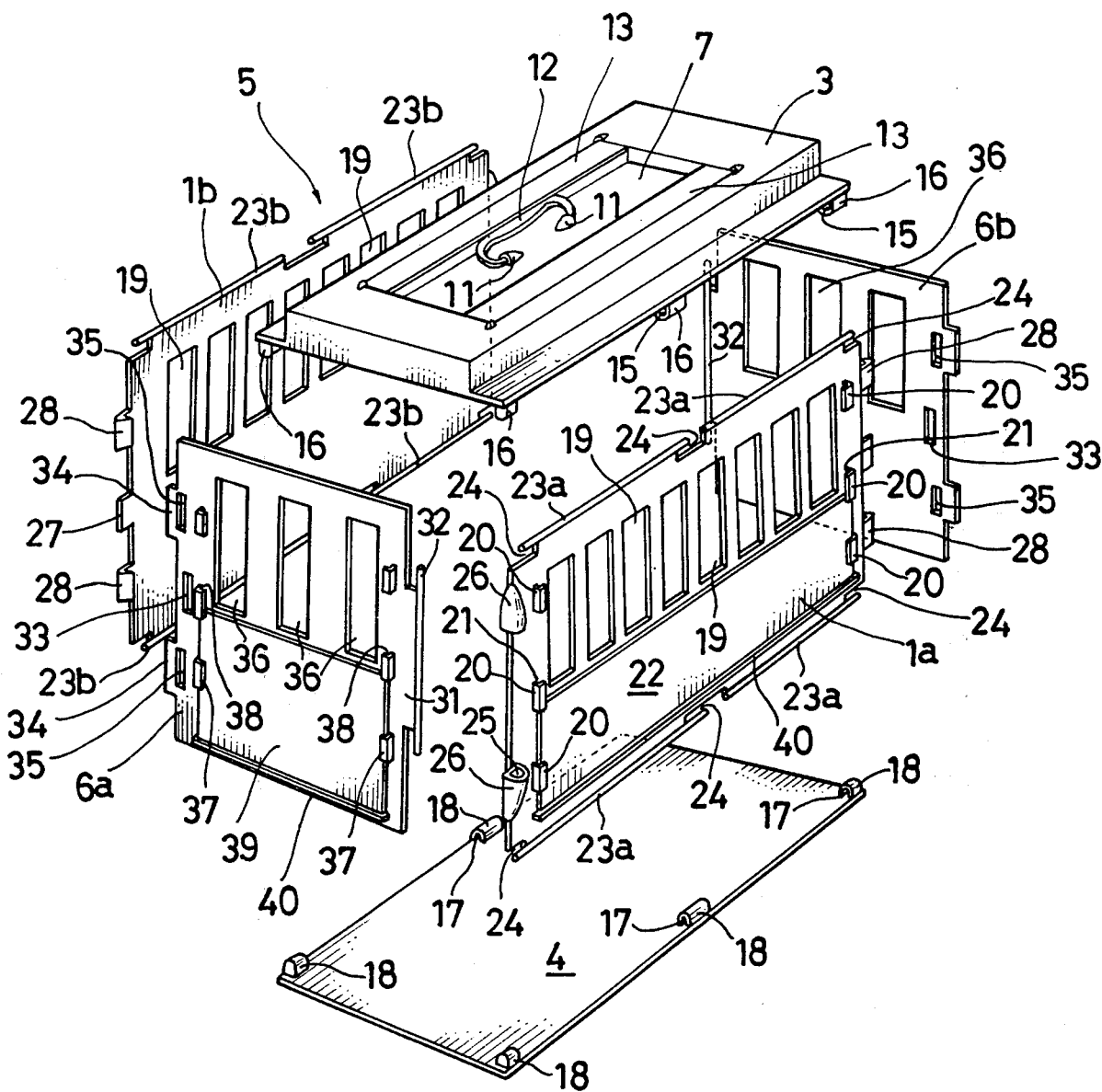
FIG. 1 is an exploded view in perspective of a portable case for carrying a small animal, illustrating a preferred embodiment of the present invention.
Figure 2:
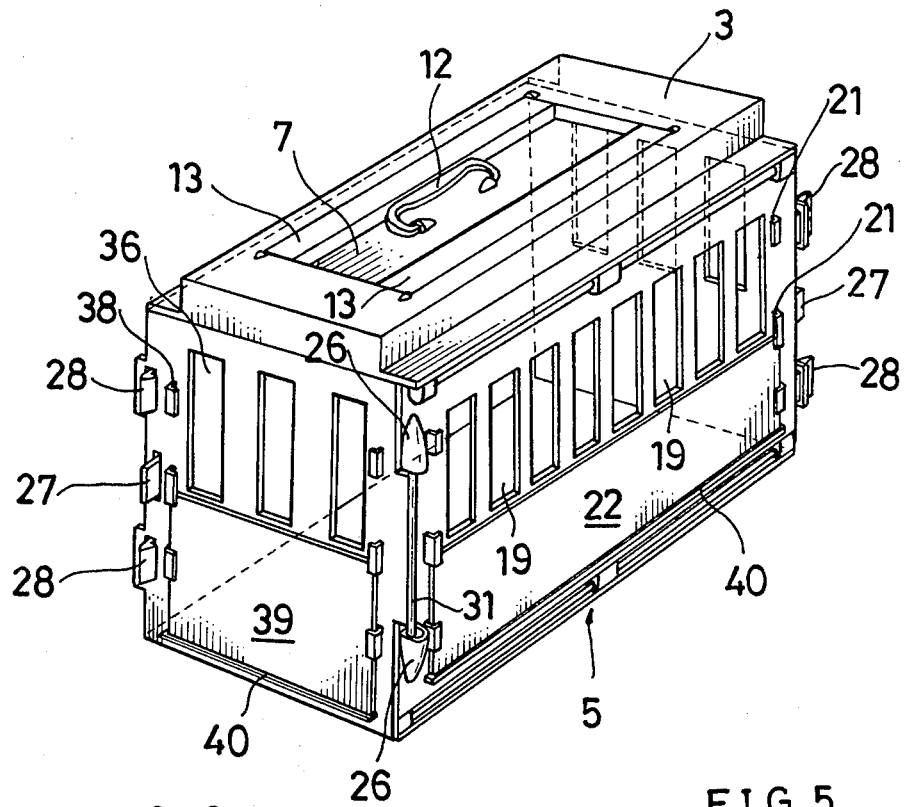
FIG. 2 is an assembly drawing of the same portable case as in FIG. 1.

As shown in FIGS. 1 and 2, the portable case according to the present invention comprises a case body and two door leaves 6a, 6b; wherein the case body 5 is made up of two side wall boards 1a, 1b, one top board 3, and one bottom board 4, while the two door leaves 6a, 6b each shut up the respective openings at either side of the case body 5.

Figure 6:
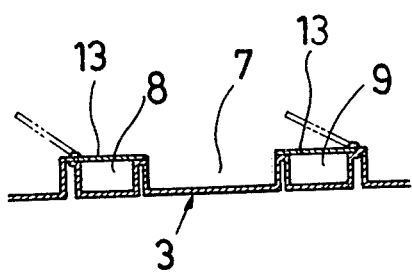
FIG. 6 is a cross sectional view of the top board.

The top board 3, as shown also in FIG. 6, is formed at its upper surface with three concave parts 7, 8, 9, but of which the middle concave part 7 is provided vis-a-vis with two pivote bearings 11, 11. Into these pivote bearings 11, 11 are inserted both the end points of a grip 12 while being pivotably held thereat so as to be able to be raised or laid with freedom. The left and right concaves 8, 9, which are situated on the both sides of the middle concave 7, are converted with the respective lids 13 long and narrow. These lids each are fitted rotatively at their own sides. By the way, these two concaves are used as a container in which small articles such as tethers and others are stored. Thus designed, these concave serve the purpose of neatly receiving the grip and the other small articles, so that the grip does not happen to protrude, following that the whole case comes to be foldable in compactness. Further, pivot bearing bodies 16 having pivot bearing holes 15 are formed projecting integrally along the under side of the left and right brims of the top board 3 at the middle and both end parts.

On the other hand, the bottom board 4 is in the form of a flat board, and is likewise formed projecting integrally at its left and right edges with pivote bearing bodies 18 having pivote bearing holes 17, correspondingly to the pivote bearing bodies 16 of the top board 3.

Now, two side wall boards 1a, 1b opposing face to face are provided at their own upper half with a plurality of windows 19 bored each in the form of an oblong. on the both sides of a row of these windows 19 each are formed L-shaped protrusions 20, three to every side at suitable intervals in the up-and-down direction. The vacant spaces produced between the L-shaped protrusions 20 and the external surfaces of the side wall boards 1a, 1b serve as guide grooves 21 upward and downward, into which both ends of window cover plates 22 are inserted slidably in the up-and-down direction. The windows 19 are able to be opened and closed by making these window cover plates 22 move up and down.

On each of the upper and lower edges of each of the side wall boards 1a, 1b, two stripes of supporting rods 23a, 23b arranged straightly along each edge are formed integrally along each of the upper and lower edges of the left and right side wall boards 1a, 1b, separately. The both end parts of these supporting rods 23a, 23b is shaped into the form of protrusions on account of the side wall boards having been partially cut away in these spots. As described before, in the present invention, the side wall boards 1a, 1b, the top board 3, and the bottom board 4 are connected hinged-jointedly to construct a single case body 5, namely, to obtain a collapsible cubical body which is made open at the both sides, by inserting each of both ends of the supporting rods 23a, 23b, which are formed at both the upper and lower edges of each of the side wall boards 1a, 1b, into the respective pivote bearing holes 15, 17 of the correspondent pivot bearing bodies 16, 18.

Figure 4:
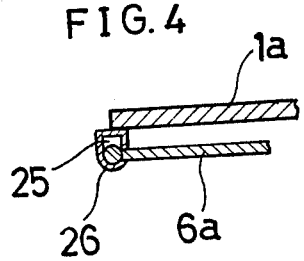

The side wall boards 1a, 1b, as shown also in FIG. 4, are provided at their one side end faces with a pair of supporting bodies 26 having longish supporting holes 25 in the direction of the thickness of the side wall boards 1a, 1b, which supporting bodies are formed integrally with the side wall boards while opposing face to face between themselves at vertically suitable intervals.

Figure 5:
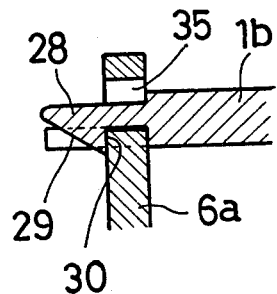
FIG. 5 is a longitudinal sectional view in part, showing the state where an engaging piece of a side wall board is being inserted in an engaging hole of a door leaf.

Further similarly, the side wall boards 1a, 1b are provided midway at their another side end faces integrally with slat-shaped guide tongue pieces 27. With the guide tongue pieces 27 as a center are formed integrally above and below a pair of engaging pieces 28, 28 at equal intervals. The inner sides of the engaging pieces, as shown in FIG. 5, are formed inclined surfaces 29 gradually thickening from the front part toward the root, and engaging step parts 30 projecting continually from the rear ends of the inclined surfaces. The two side wall boards boards 1a, 1b have the same form in common with each other.

On the other hand, the door leaves 6a, 6b, which are to cover the openings of both the front and rear sides of the aforesaid case body 5, each are formed on their respective one sides with projecting brims 31, severally.

Along the verge of the projecting brim 31 is formed integrally a supporting rod 32 in the up-and-down direction. They 6a, 6b are also provided at their respective central parts with perforated guide holes 33 severally, whereinto the before-mentioned guide tongue pieces are to be fitted. In an equal distance with this guide hole 33 between are formed a pair of projecting brims 34, 34, in whichare bored the respective engaging holes 35, 35. Into these holes 35, 35 are fitted the aforesaid engaging pieces 28, 28 of the side wall board. The two door leaves 6a, 6b thus formed have the same form in common with each other. The length of the supporting rods 32 formed on the door leaves 6a, 6b are made longer than the distance between the upper and lower supporting bodies 26, 26 disposed facing each other.

In order to make the supporting rod 32 of the door leaf 6a fit into the two pivot bearing bodies 26, 26 of each side wall board 1a, 1b, it will be conducted as follows:

First curve the supporting rod 32 slightly to reduce the length between its both ends so as to correspond to the pivot bearing holes 25, 25 of the pivot bearing bodies 26, 26, and then while releasing its curvature make the both ends of the supporting rod 32 swingably pivot into the respective pivot bearing holes 25, 25 owing to the return of the elasticity of the supporting rod 32. As shown in FIG. 4, the pivot bearing bodies 26, 26 are projecting outward from the side wall board 1a, 1b, and consequently the door leaves 6a, 6b, can be folded back freely on the external surfaces of the side wall boards 1a, 1b.

Figure 3:
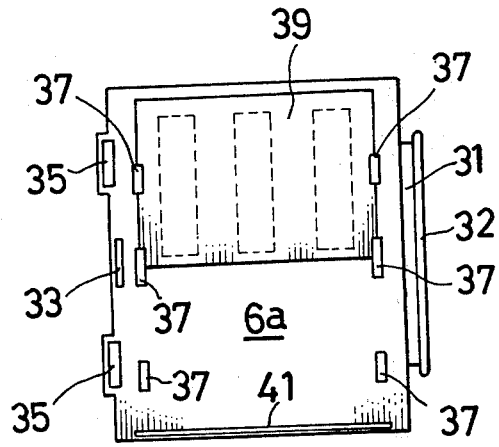
FIG. 3 is a front view of one of the door leaves.

Reference numerals 36, 36 indicate a plurality of windows provided side by side on the upper half of the door leaves 6a, 6b likewise as the case of the above-mentioned side wall board 1a, 1b. On both sides of such a row of windows are formed L-shaped protrusions 37 like the case of the side wall board 1a, 1b. The spaces created between these L-shaped protrusions 37 and the external surfaces of the door leaves 6a, 6b constitute the guide grooves 38, 38, into which the both sides of the window cover plate 39 are inserted in a state slidable in the up-and-down direction, being made to serve to open and close the windows 36. That is, when the window cover plate 39 is raised, it is the time of the windows having been closed, as shown in FIG. 3, and when it is let to fall, the time of the windows having been opened, as seen in FIGS. 1 and 2.

In this connection, it is desirable to provide the side wall boards 1a, 1b and the door leaves 6a, 6b or further their respective window cover plates 22, 39 with some engaging means such as, for example, some kind of protrusions for the purpose of retaining the window cover plates 22, 39 at the point of time of their having been raised. Down below the window cover plates 22, 39 are provided protruding strips 40 with the view of preventing them from falling-off.

In order to carry the portable case according to the present invention in the state of a small animal being put therein, as a start rotate the door leaves 6a, 6b, and engage the guide hole 33 with the guide tongue piece 27 of the side wall board 1a, 1b and the engaging holes 35 with the engaging pieces 28 of the same board 1a, 1b, when the engaging holes 35 pass over the inclined surfaces 29 formed at the inner sides of the engaging pieces 28 while making the engaging pieces 28 slightly curve outward. And at the point of time of the engaging holes 35 having reached the engaging step parts 30, the engaging pieces 28 return to their original position through their own elasticity, thus the complete state of engagement being achieved. That is, as shown in FIG. 5, the guide tongue piece 27 is provided for holding the door leaves 6a, 6b so as to be always engaged at the engaging step parts 30 by preventing the door leaves 6a, 6b from their transverse shifting. Consequently, there is not at all a possibility of these door leaves 6a, 6b coming off at the time of carrying this case or anytime, and as a result there is also no fear of the small animal running away out of it.

Referring now to how to open the door leaves 6a, 6b, it is easily completed by doing as follows:

For a start, press sofly outward the engaging pieces 28,28 showing the before-described state of engagement to make them a little curved, and, after releasing the engagement of the engaging step parts 30, 30 of the engaging pieces 28, 28 with the engaging holes 35, 35 of the door leaves 6a, 6b, rotate the door leaves 6a, 6b with the supporting rod 32 as a center in the direction opening the door leaves.

Figure 7:
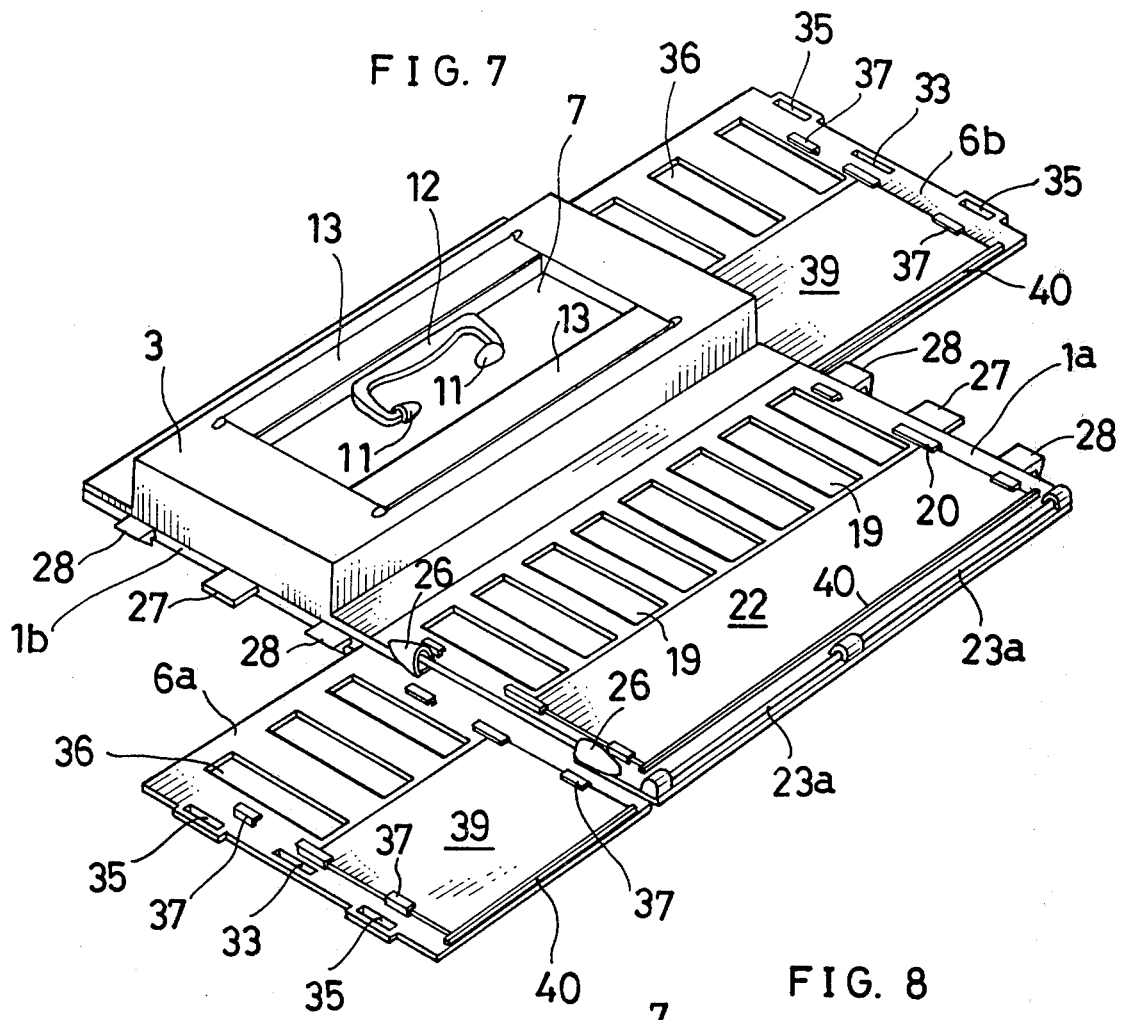
FIGS. 7 and 8 are perspective views, showing the folding method and the already folded state, respectively, of the portable case according to the present invention.
Figure 8:
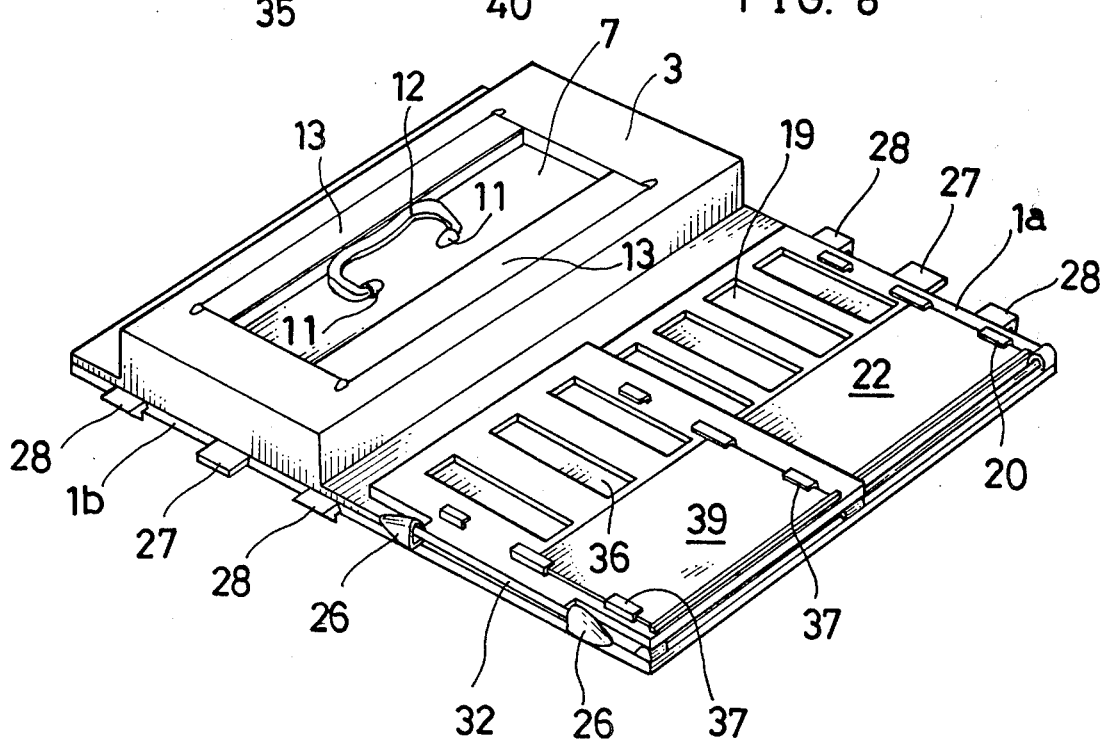

In order to fold up the portable case for carrying a small animal according to the present invention at the time of not using it, it will do well only to execute in compliance with the same knack as before. That is, if the door leaves 6a, 6b on both sides are opened, the cubical form of the case body 5 deforms naturally of itself because the side wall boards 1a, 1b, the top board 3, and the bottom board 4 are connected to each other only through the aid of hinged joints, as shown in FIG. 7, when the back of the top board 3 comes into contact with the inside of either of the side wall boards 1a, 1b, and the surface of the bottom board 4 touches with the remaining inside of the side wall boards 1a, 1b, thus a flat thing being obtained in the folded state. Then, as shown in FIG. 8, if the door leaves 6a, 6b are folded back with the supporting rod 32 as a fulcrum on the outside of the side wall boards 1a, 1b, the state of being completely folded can be achieved. In such a manner, the process of folding the case is extremely easy and simple.

Since the pivot bearing bodies 26, 26 supporting the door leaves 6a, 6b is made projecting outward from the side wall board 1a, 1b, it is possible to execute without the smallest strain the above-mentioned assembling and folding method, by which the surface of the door leaves 6a, 6b is to be brought into close contact with the outer surfaces of the side wall boards 1a, 1b, therewith obtaining a good state of being folded.

The present invention is not limited only to the above-described embodiment and is able to make various changes and modifications without departing from the scope of the appended claims.

What is claimed is:

1. A portable case for carrying a small animal, which comprises a case body and two door leaves; said case body being composed of two side wall boards opposing each other, one top board being mounted hinge-jointedly on the upper end faces of said side wall boards, and one bottom board being attached likewise hinge-jointedly to the lower end faces of said wall boards; said side wall boards being formed at their upper and lower end faces with elongate rods integrally, end portions of said upper and lower faces of each side wall board being cut away so that end portions of said rods protrude to define pivot pins; said top board and said bottom board being provided integrally with cooperating pivot bearings whereby said side wall boards, said top board and said bottom board are all connected hinge-jointedly by inserting said pivot pins into said pivot bearings; said case body thus having openings at its front and rear side and becoming foldable; said door leaves covering said openings and pivoting severally their own one sides on end faces of ones of said boards thereby to be foldable back onto the outer surface of said ones of said boards; the other side of said door leaves being free to be engaged and disengaged with and from the other end faces of said boards.

2. A portable case for carrying a small animal as set forth in claim 1, which is characterized in that said wall boards are formed at the one side end faces with guide tongue pieces and engaging pieces having engaging step parts, and said door leaves are formed at the one side end parts with guide holes and engaging holes, both engaging with said guide tongue pieces and said engaging pieces, respectively, so as to enable said door leaves to freely engage and disengage with and from the end parts of said side wall boards.

3. A portable case for carrying a small animal, which comprises a case body and two door leaves; said case body being composed of two side wall boards opposing each other, one top board being mounted hinge-jointedly on the upper end faces of said side wall boards, and one bottom board being attached likewise hinge-jointedly to the lower end faces of said wall boards; said case body thus having openings at its front and rear side and becoming foldable; said door leaves covering said openings and pivoting severally at their own one sides about an end face of one of said boards of said case body, the other sides of said door leaves being formed with guide slots and engaging slots respectively; and cooperating, interfitting guide tongues and engaging pieces formed projecting outwardly from a facing end face of said case body, said guide slots and guide tongues cooperating upon interengagement thereof to substantially prevent relative movement between said doors and said case body in a manner which would disengage said engaging slots from said engaging pieces.

4. A portable case for carrying a small animal as set forth in claim 3 or 2, which is characterized in that said side wall boards are formed in the middle part of the one side end parts with said guide tongue pieces, and on both sides of said guide tongue pieces, above and below, with said engaging pieces at suitable intervals.

5. A portable case for carrying a small animal as set forth in claim 3 or claim 4, wherein said engaging pieces are formed with inclined surfaces gradually thickening from the front parts toward the roots and further with engaging step parts projecting continually from the rear ends of said inclined surfaces.

6. A portable case for carrying a small animal as set forth in claim 3 or claim 1, which is characterized in that said side wall boards are formed on the another side end parts with pivot bearing bodies having pivot bearing holes opposing each other, above and below, and door leaves are formed integrally on the another side end parts with supporting rods, whereby said door leaves are made to be rotatable through engaging both ends of said supporting rods with said pivot bearing holes.

7. A portable case for carrying a small animal as set forth in claim 3 or claim 1, wherein said side wall boards and/or said door leaves are furnished with windows.

8. A portable case for carrying a small animal as set forth in claim 7, wherein guide grooves are provided on both sides of a row of said windows in the up-and-down direction, and both left and right ends of window cover plate are inserted into said guide grooves slidably in the up-and-down direction, whereby said windows is made to be opened and closed at will.

9. A portable case for carrying a small animal as set forth in claim 1 or claim 3, wherein said top board is formed on its upper face with a concave in which a grip is fixed in such a manner as to be freely raised and laid.

10. A portable case for carrying a small animal as set forth in claim 1 or claim 3, wherein a concave formed on the upper face of said top board is covered by the use of a lid provided for opening and closing said concave, which serves as a container for putting small articles thereinto.

11. A portable case for carrying a small animal as set forth in claim 10, wherein two concaves for receiving small articles are formed on the both sides of said concave to which said grip is attached.

12. A portable case for carrying a small animal as set forth in claim 1 or claim 3, wherein each member is all made of synthetic resinous material.

* * * * *